LOW LYING ENERGY LEVELS
OF THE CARBON ATOM

May 14, 1968 W. D. WILSON ET AL 3,383,298
METHOD FOR SYNTHESIS OF CARBON CRYSTALS
Filed April 27, 1965 3 Sheets-Sheet 2

Wayne D. Wilson
Hubert B. Hall
INVENTORS.

BY

ATTORNEY.

AGENT.

Wayne D. Wilson
Hubert B. Hall
INVENTORS.

United States Patent Office 3,383,298
Patented May 14, 1968

3,383,298
METHOD FOR SYNTHESIS OF CARBON CRYSTALS
Wayne D. Wilson, 2000 Wallace Ave., Silver Spring, Md. 20902, and Hubert B. Hall, 716 Sommerset Place, Hyattsville, Md. 20783
Filed Apr. 27, 1965, Ser. No. 451,361
7 Claims. (Cl. 204—155)

ABSTRACT OF THE DISCLOSURE

A method for making hard carbon crystals by exciting carbon atoms in the presence of a strong magnetic field.

---

The invention described herein may be manufactured and used by or for the Government of the United States of America for governmental purposes without the payment of any royalties thereon or therefor.

This invention relates to the synthesis of crystalline carbon. More particularly, the invention relates to the production of clear crystals of carbon, which in some instances exhibit tetrahedral diamond structure.

The hardness of all the crystals produced by the present invention exceeds 7.5 on the Moh scale and in some of the crystals tested, the hardness exceeded 9. The crystals are therefore useful as abrasive material. While X-ray analysis of the crystals does not show the characteristic diamond lines in all instances, it is believed that there is some tetrahedral diamond present in these crystals. The other forms present may be carbon crystals of the kind described by Baker et al. in U.S. Patent 2,746,642 or they may be other forms of diamond, such as the hexagonal polymorph described by Ergun and Alexander in Nature, v. 195 of Aug. 25, 1962, at p. 765.

The various methods employed by the prior art to synthesize carbon in its various forms have usually involved the use of the expensive high pressure apparatus, as in the various General Electric patents, or time consuming methods as in the epitaxial growth methods described by Eversole in his patents, U.S. 3,030,187 and 3,030,188.

It is an object of the present invention to provide a novel method of synthesizing carbon crystals, including tetrahedral diamond crystals, under conditions of relatively low temperatures and low pressures.

It is another object of the invention to synthesize crystalline carbon by a method which does not require the use of high pressure equipment and in which a high yield of crystals is obtainable in a substantially short time.

Briefly described, the invention comprises exciting the electronic states of individual carbon atoms to the level indicated by the spectroscopic notation $2s2p^3$ and then allowing the excited atoms to combine within the field of a strong magnet, or in a strong electric field. The exact influence of the magnetic or electric fields on the formation of crystals from carbon is not known. However, it has been found empirically that clear crystals will form in the presence of these fields, but will not form when either field is not present. The required excited states can be produced in many ways, as by irradiating the carbon with ultraviolet light or by bombarding it with X-rays, electrons or nuclear particles. An electric arc or spark can also be used for this purpose. The magnetic field may be provided by means of a permanent magnet or an electromagnet. The electric field may be supplied by means of a parallel plate condenser or the like.

Figure 1:
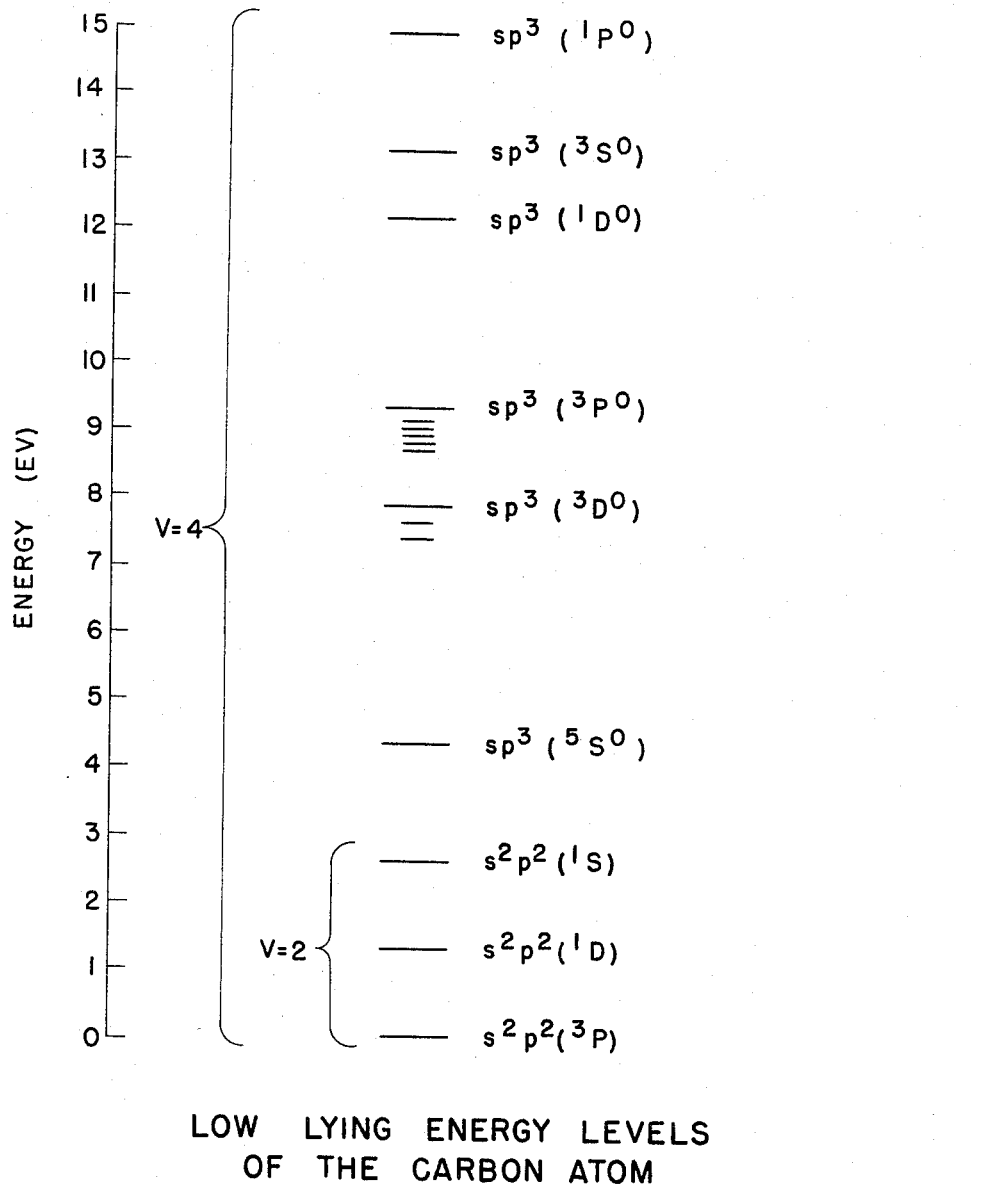
Figure 2:
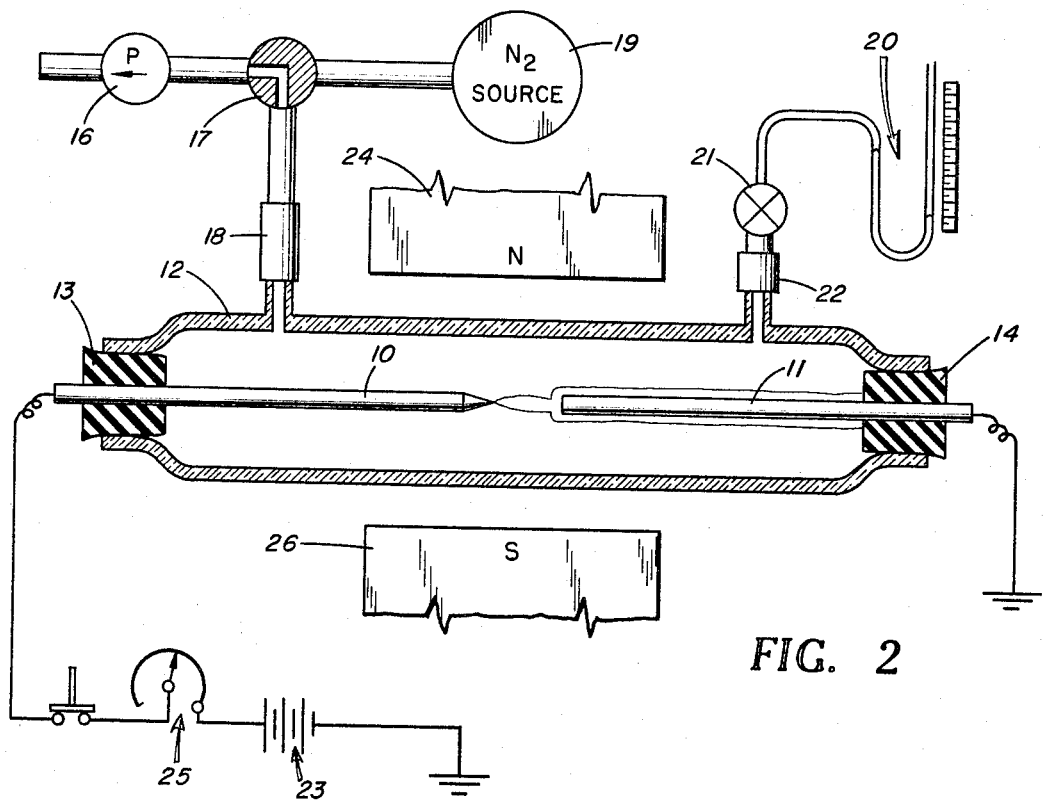
Figure 3:
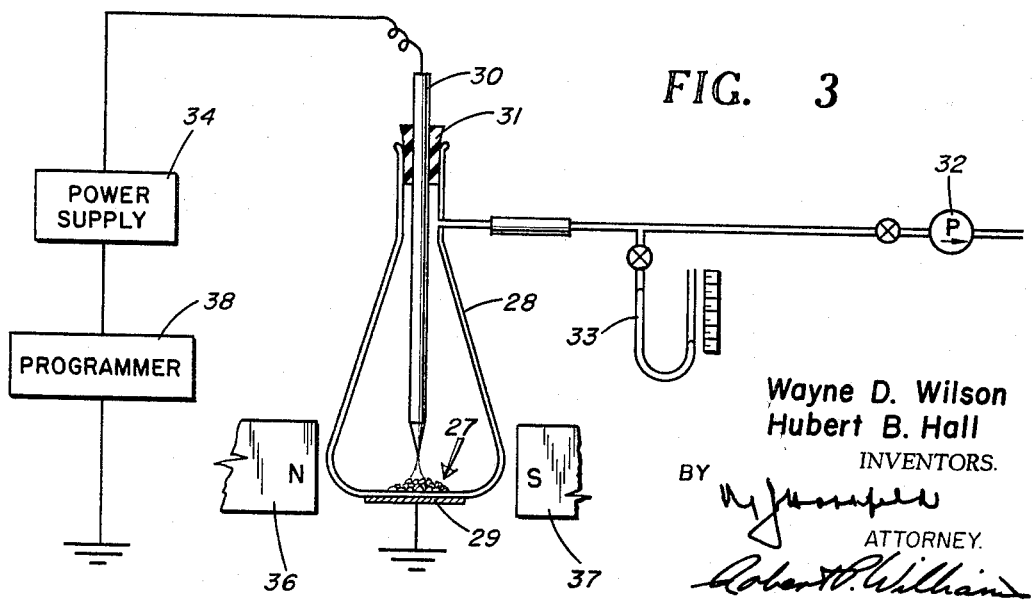
Figure 4:
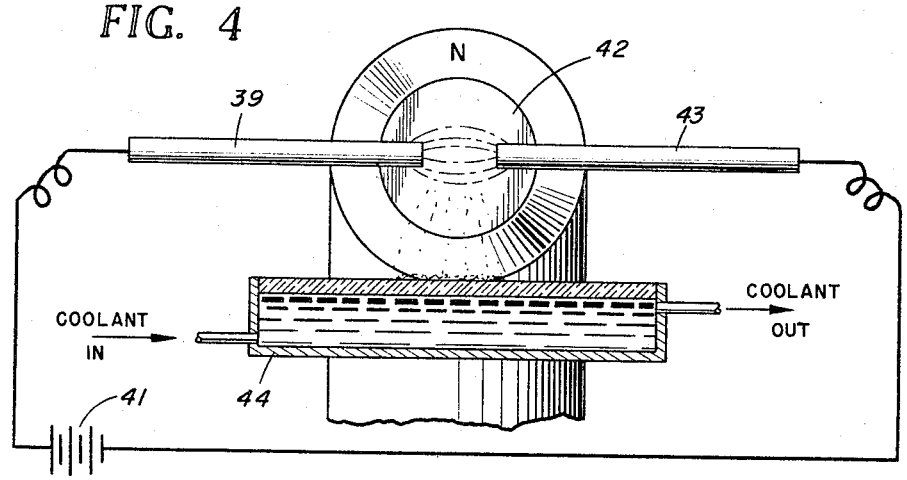
Figure 5:
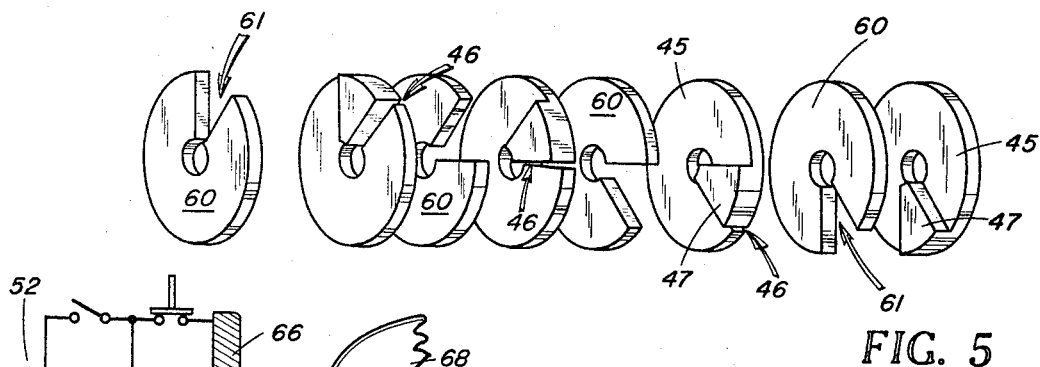
Figure 6:
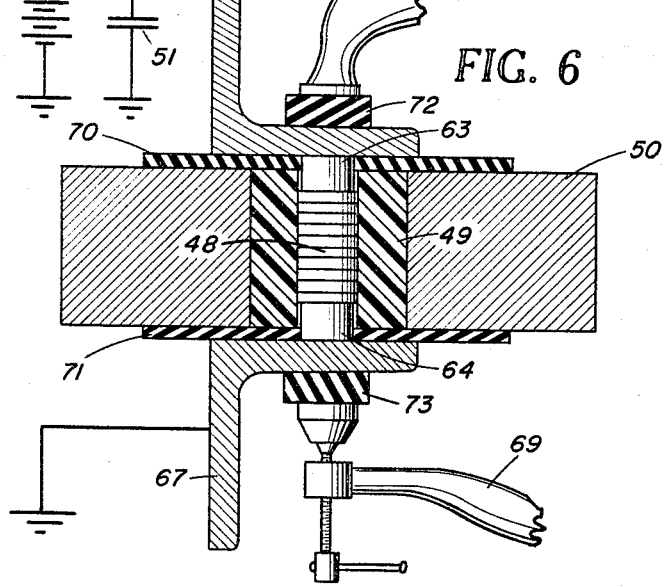

The method according to the invention will be better understood from a reading of the following detailed description when taken with the accompanying drawings wherein:

FIG. 1 is a diagram of the low-lying energy states of carbon;
FIG. 2 is a diagrammatic showing of one form of apparatus for carrying out the method of the invention;
FIG. 3 is a diagrammatic showing of another form of apparatus capable of carrying out the invention;
FIG. 4 is a showing of still another alternate form of apparatus;
FIG. 5 is an exploded view of components useful in the apparatus of FIG. 6; and
FIG. 6 is a showing of another alternate apparatus.

As indicated above, the essential conditions reqiured in the method are a suply of individual carbon atoms in an excited state and a strong magnetic or electric field. The reasons why clear crystals form under these conditions are not fully understood, but the following is offered as a possible explanation.

The low-lying energy levels of the carbon atom are shown in FIG. 1, which has been taken from page 120 of Pauling, The Nature Of The Chemical Bond, third edition, Cornell University Press, Ithaca, N.Y., 1960. The three lowest energy levels, described by the Russell-Saunders symbols $^3P$, $^1D$ and $^1S$, correspond to the ground state, which is given in spectroscopic notation as $1s^22s^2sp^2$. Carbon in this state has two unpaired electrons; and, this configuration can be the basis of the bivalent state of the carbon atom.

For this carbon atom to be quadrivalent, it is required that the atom be raised to the excited state described by the spectroscopic notation $1s^22s2p^3$ by raising one of the $2s$ electrons to the $2p$ level. The six levels corresponding to this configuration are indicated in the upper part of the figure. In all six of these states, there are four orbitals in the valence shell, that is, the $2s$ orbital and the three $2p$ orbitals. According to Pauling these are not, however, the orbitals used directly in bond formation by the atom. Pauling postulates on page 113 that the normal state requires a minimization of the energy of the system. He states that the energy of a system of a carbon atom and four attached carbon atoms is minimized by making the bond energies as large as possible. It is found that a bond orbital formed by a linear combination of $s$ and $p$ orbitals has a bond strength greater than that for an $s$ or a $p$ orbital alone, the strength of the best $s$-$p$ hybrid bond orbital being as great as 2. Such an orbital is greatly concentrated in the bond direction.

Pauling goes on to state that when it is sought to make the energy of a second bond as large as possible by forming another hybrid orbital of maximum bond forming power, it is found that this second bond orbital is equivalent to the first with strength 2, and that its bond direction makes the tetrahedral angle 109°, 28' with that of the first. Moreover, a third and a fourth equivalent orbital can be constructed, the four being directed toward the corners of a regular tetrahedron and this then accounts for all the orbitals in the valence shell. A rigorous treatment of these considerations is given in Pauling beginning with page 116 and extending to 118.

Pauling also indicated that the tetrahedral bonding situation might be improved somewhat by the introduction of some $d$ and $f$ character into the bond orbitals to concentrate them more closely about the tetrahedral directions. It is suggested that if the four valence electrons have parallel spins, the electrons will have a greater tendency to avoid one another and to assume the tetrahedral structure. An atom with four valence electrons having parallel spins will have a total spin quantum number (S) of 2. The contribution of each electron to the total is ½, and since all four are parallel, the vector sum is simply $+\frac{1}{2}+\frac{1}{2}+\frac{1}{2}+\frac{1}{2}$ or 2. Now, the superscript found in Russell-Saunders notation is equal to $2S+1$, so for a total spin quantum number of 2, $2S+1=2(2)+1=5$. Reference to FIG. 1 shows that there is only one state of the carbon atom which is described by a notation having a superscript of 5, that being the lowest $sp^3$ level, the $^5S$ level. It is believed therefore that the $^5S$ state is most favorable for the formation of tetrahedral bonds.

There is another condition, based on the lifetime of the $^5S$ state, that is believed to be required for the formation of tetrahedral carbon crystals. The decay time of carbon in the $^5S$ state is short compared with the time required for formation of a sufficient number of inter-atomic bonds to provide a sizeable crystal. Thus it appears that to produce sizeable crystals some mechanism is required to increase the ratio of the decay time to the time required for the formation of a large number of bonds.

One way to improve the decay time-bonding time ratio is to decrease the bonding time by increasing the thermal activity of the excited atoms. High temperatures, however, have the effect of increasing the number of collisions between the atoms, which has the undesirable result of decreasing the life-time of the population of excited states. This indicates that there is some optimum temperature at which the ratio is at a maximum. As will be seen below, it has been found that this optimum lies somewhere around the temperature of Dry Ice. The main problem appears to be to obtain a concentration of excited carbon atoms in a given region of space which is small compared with the distance that a carbon atom will travel during the time it decays to the ground state. It is felt therefore that one of the conditions which is required for the formation of clear crystals of carbon is to confine the excited carbon atoms to a region of space which is small. The magnetic field may serve to accomplish this. If the excitation of the atoms is high enough to ionize them, they will be confined by the field to small circular orbits. Then when they capture electrons and decay to the $^5S$ state, they will have been prevented from migrating outside of the small region of space determined by the size of the circular orbit.

The magnetic field may have other effects. As stated above, the excited $sp^3$, $^5S$ carbon atom has the spins of the four valence electrons aligned to give a total spin quantum number of 2. Under normal conditions, the excited carbon atom will decay to the ground state by the fall of one of the $p$ electrons to the $s$ state. Reference to the Russell-Saunders symbols indicative of the ground state of carbon in FIG. 1 indicates that in the ground state the total spin quantum number is either 0 or 1, which indicated that at least one of the spins must flip over to the anti-parallel condition during the decay. It is thought that the presence of a strong magnetic field tends to prevent the reversal of the spin vector and therefore serves to increase the life-time of the $^5S$ state.

The magnetic field may also influence the structure into which the carbon atoms combine by orienting the directions of the orbitals with respect to the direction of the field. An $s$ orbital, with orbital angular momentum of 0, can have only one orientation in a magnetic field. A $p$ orbital, however, has the magnitude of its orbital angular momentum vector L equal to 1 and may assume 3 orientations in the field. Since the number of possible orientations of the orbitals in the free carbon atoms is thus limited by the field, it is believed that some ordering of the structure results. Thus it might be said that the method of the invention provide a plurality of excited carbon atoms in the $^5S$ state, the most favorable tetrahedral state, and in addition, confines the atoms in this state to a limited number of orientations with respect to the applied field. It remains then only for the atoms to pass close enough to one another so that the bond orbitals overlap to a sufficient extent to result in a covalent bond. When this occurs, the crystal begins to build and if the life-time of the population of atoms in the excited state can be maintained for a sufficient time, enough excited atoms can combine to form a crystal of appreciable size.

The exact function of the electric field in producing clear crystals from carbon is also not known. It is believed, however, that the electric field induces a form of polarization in the carbon atoms, in such a manner that they can combine to form a structure which is different from that which would occur from unpolarized atoms. It may be that the electric field has an effect on crystallization similar to that of a catalyst, since a catalyst affects the electronic structure of atoms to cause them to combine in a manner which is not possible without the catalyst. In addition, the parallel plates used to provide the field, provide polarized surfaces which appear to attract the carbon atoms to preferred sites. Moreover, the carbon has less kinetic energy when it is in contact with a charged plate. Thus, the electric field confines the atoms to a small region of space and increases the rate of nucleation. In summary, the activities of the electric field are believed to be the confining of the excited atoms to a region in space small compared to their mean-free path, the attraction of the atoms to a nucleation site and the lowering of their kinetic energy near the nucleation site.

The following examples will further illustrate the nature of the invention.

Example I

In the experimental arrangement illustrated in FIG. 2, the source of carbon is a pair of spectroscopic graphite rods 10 and 11 which are sealed in a silica tube 12, as for example by being held in rubber stoppers 13 and 14. A vacuum pump 16 communicates through a two-way valve 17 and a connection 18 with the interior of tube 12. In its alternate position, two-way valve 17 connects the interior of tube 12 to a source of nitrogen gas 19. In setting up the system, tube 12 is first evacuated by operation of pump 16 and then nitrogen gas is admitted to the chamber to a pressure of about 0.5 millimeters of mercury. The pressure may be monitored by means of a pressure gauge such as manometer 20, connected to the interior of tube 12 via a valve 21 and a connection 22.

The excitation of the carbon atoms is accomplished in the system of FIG. 2 by means of an electric glow discharge between and around graphite rods 10 and 11. To accomplish this, the rods are connected in circuit with a D.C. power supply indicated generally by the battery 23. A rheostat 25 is provided to adjust the current through the tube. The discharge in tube 12 draws a current of about 5 milliamperes at about 500 volts. The required magnetic field is established by placing tube 12 between the poles 24 and 26 of a permanent magnet, which in the case of this example was a 5000 gauss permanent magnet.

The early experiments using the present apparatus were carried out with air in the tube 12. It was later learned that the spectrum of neutral nitrogen has a strong line at 1335.3 Angstroms, which corresponds very closely to two of the most persistent lines of carbon, which exhibit wave lengths of 1334.5 and 1335.7 Angstroms. This suggests that a photochemical reaction may be involved. The nitrogen in the air in the original experiments and the $N_2$ from the nitrogen source 19 in the later experiments is excited by the discharge within the tube to emit the characteristic radiation of nitrogen. This radiation is then absorbed by the carbon atoms from the graphite rods, raising them to a higher energy level which, as stated above, appears to be prerequisite to the formation of tetrahedral bonds.

Some unknown characteristic of the graphite starting material seems to influence the formation of crystals. When Ultra Carbon, Grade 5840 electrodes obtained from the Ultra Carbon Corporation, Bay City, Mich., are used, the arc discharge or other activity within the tube 12 causes the grounded electrode to be eroded away. The erosion occurs substantially uniformly over the cylindrical surface of the grounded electrode. About 6 hours after the discharge is initiated, a surprising observation can be made. Clear crystals can be seen on the cylindrical surface of the graphite rod. These crystals are situated at the ends of graphite mesas or columns projecting out radially from the surface of the electrode. It is believed that the electron bombardment from the discharge and the collisions of the nitrogen molecules with the surface of the rod disassociates the carbon into individual carbon atoms. The free carbon atoms then absorb the ultra violet light emitted by the nitrogen and are raised to an excited state. The excited carbon atoms then combine to form the clear crystals on the surface of the graphite rod. These crystals are extremely hard and it is apparently this hardness which protects the graphite which underlies the zone on which they have formed. As the erosion of the unprotected areas continues, the mesas or columns are formed.

Spectographic graphite, "National" AGKSP, obtained from the Union Carbide Corporation, 270 Park Avenue, New York, N.Y., behaves in a somewhat different manner. These rods do not erode easily and the crystals form directly on the surface of the graphite rod rather than on the ends of columns.

In one variation of this experiment, carbon black was placed in the bottom of tube 12 just below the gap between the graphite electrodes. The direction of the magnetic field was arranged so that the main discharge between the electrodes was deflected into and through the carbon black. By properly adjusting the magnitude of the field, this discharge could be made to just skim over the top of the carbon black. The same crystals formed on the grounded electrode as in the previous experiment. There were, however, a large number of clear crystals which formed in the mass of the carbon black. It has been observed that a larger number of these crystals form when the surface of the tube 12 is held in contact with Dry Ice.

The crystals formed in this apparatus have a density greater than 2.8 g./cm.$^3$, an index of refraction greater than 2.25, and a hardness greater than 8 on the Moh scale.

The presence of a magnetic field appears to be necessary to the formation of clear crystals in the present apparatus. Tests were performed with the discharge but with the magnet removed from the apparatus of FIG. 2. These tests failed to produce clear crystals even though the arc was run for a period of 48 hours.

Example II

In the apparatus shown in FIG. 3, a quantity of carbon black, indicated generally at 27, is placed in a silica container 28. A metal electrode 29 is attached to the outside of the container 28 as shown. A pointed electrode 30 is held in the open end of the container 28 by means of a sealing plug 31. The interior of container 28 is connected through suitable tubing to a vacuum pump 32 and a manometer 33. The range of operable pressures has been determined to be between 10 mm. of Hg and atmospheric.

In order to provide the required excitation, the electrodes 29 and 30 are connected to a suitable power supply 34 which may be either a high voltage A.C. or D.C. source capable of providing a discharge of 30,000 volts A.C. or 15,000 volts D.C. The discharge extends between the pointed electrode 30 and the outside electrode 29 through mass of carbon black 27. The magnetic field is supplied by poles 36 and 37 of a suitable magnet, which in this case was a 10,000 gauss magnetron magnet.

When the apparatus is operated under the conditions outlined above, clear microscopic crystals will form from the carbon black providing the carbon is not allowed to overheat. At room temperature, this can be prevented by maintaining the arc in the on condition for one minute and turning it off for five minutes between one minute cycles. This can be accomplished by means of a timer switch of ordinary construction, which is generally indicated in FIG. 3 as programmer 38. Cycling in this manner, with a total discharge time of approximately 1 hour, will produce a sufficient number of crystals to be seen under a microscope at 50 power. More crystals form when the container is maintained in contact with Dry Ice. When the temperature is reduced still further, to that of liquid nitrogen, for example, crystals still form, but they are smaller in size and are less numerous. In addition, the majority of the crystals which form at liquid nitrogen temperatures are black in color. The crystals which form at the temperature of Dry Ice and at temperatures near room temperature are mostly clear. Occasionally, these crystals reach a size of one-half millimeter as their largest dimension. Some of the crystals exhibit clearly defined growth planes. The majority, however, show no particular external structure. X-ray powder pictures of the crystals show the main graphite lines, the first twelve lines predicted for the hexagonal polymorph of diamond, and ten additional lines which have not been identified.

Example III

FIG. 4 illustrates apparatus for carrying out the method at atmospheric pressure in an air environment. A low voltage, 110 volt, 10 ampere discharge is maintained between two spectroscopically pure graphite rods 39 and 40 by connecting them to a suitable power supply 41. The graphite rods are supported in any convenient manner between the poles of a 10,000 gauss magnetron magnet, one pole 42 of which can be seen in FIG. 4. As the discharge occurs with time, carbon atoms are liberated from the graphite electrodes. A glass plate 43 is placed below the discharge zone to collect the carbon which is liberated. Plate 43 may be cooled as by placing a coolant reservoir 44 in contact therewith. The magnet may also be cooled to prevent overheating.

A variety of different types of crystals are found on the glass plate, which can be classified as follows. Some of the crystals have four flat sides which form a pyramidal structure with rounded corners. These crystals are generally yellow in color. Other crystals which form are whiskers which grow from a single membrane. Usually, 8 transparent whiskers grow from a single nucleus. The third type of crystal which occurs is a translucent polycrystalline mass. Finally, small clear crystals are found. These crystals each have densities greater than 2.8, and the clear crystals are hard enough to scratch ruby. Although X-rays showed the diamond lines to exist in these crystals, there were numerous other lines which prevented precise identification of their structure.

Example IV

A coil was constructed from copper washers as follows. The structure of the washers is illustrated in FIG. 5. Each washer 45 was slotted radially as indicated at 46 and was then milled to produce a thicker portion 47 of segmental shape. Insulator discs 60 are provided with segmental cut-outs 61 which are complementary to portions 47. The washers 45 are stacked, alternately with insulators 60, with the portion 47 of each washer engaging the next washer in the stack to form a coil of high current carrying capacity.

Referring now to FIG. 6, the coil is there shown as inserted into a cylindrical bore 48 in a cylindrical insulator 49, made of Teflon for example. Insulator 49 is in turn placed inside a soft iron binding ring 50. The carbon to be crystallized is supplied by a spectrographically pure graphite rod which is insulated within thin Teflon sheet and placed inside the coil.

Electrical contact is made with the ends of the coil by means of a pair of conductive plugs 63 and 64 which extend out of bore 48. Plugs 63 and 64 are in turn contacted by L-shaped conductors 66 and 67 which are clamped in place by a large C-clamp, the ends 68 and 69 of which are shown. Insulators 70 and 71 are provided to insulate conductors 66 and 67 from binding ring 50, while insulators 72 and 73 are provided to prevent a short circuit through the C-clamp.

Conductors 66 and 67 are connected across a 20,000 volt, 15 microfarad capacitor 51 which is in turn connected across a power supply 52. In operation, capacitor 51 is first fully charged by connecting it to power supply 52. The capacitor is then discharged through the coil. It is estimated that this discharge causes a magnetic field change of 300 million gauss per second in the graphite specimen. The peak magnetic field obtained is computed to be about 3,000 gauss.

The reaction between the current in the coil and the induced current in the graphite specimen causes the effective pressure on the graphite to be about 5,000 atmospheres. The coil is destroyed during the discharge by the deformation caused by the pressure, and occasionally the graphite itself is fractured by the impacting force. When the graphite rod is pulverized and the constituents are separated, as by washing them in bromoform, small clear crystals remain in the separation dish. These crystals have densities which exceed 3.4 g./cm.$^3$ and were harder than 7.5 on the Moh scale.

It should be noted that any potential source of carbon may be used in the apparatus of FIG. 6. Crystals obtained from paraffin by this technique gave X-ray $d$-spacings which agreed exactly with the $d$-spacings obtained from the crystals discussed in Example I above.

The method according to the invention and the practice of the above exemplary methods produces crystals exhibiting four general forms. These forms are (1) clear single crystals, (2) polycrystalline material, (3) yellowish (four-sided) pyramidal structures, and (4) whiskers. In some, but not all, of the samples of crystals produced, X-ray powder pictures indicate that tetrahedral diamond is present. The crystals all have a density exceeding 2.8 g./cm.$^3$ and an index of refraction greater than 2.25. The hardness of all the crystals exceeds 7.5 on the Moh scale and, in some crystals tested, the hardness exceeded 9. The range of hardness of these crystals is therefore comparable to that of Emery which varies in hardness between 7 and 9 on the Moh scale. The harder crystals produced by the invention are comparable in hardness to Corundum, having a hardness of 9. Thus it is clear that the crystals of the present invention should be of utility as abrasive.

It will be apparent from the above description that the method according to the invention is subject to wide variation in the manner in which the essential steps are carried out. Accordingly, it should be understood that within the scope of the appended claims, the invention may be practiced otherwise than as herein specifically described.

What is claimed is:

1. A method of synthesizing clear crystalline carbon comprising the steps of exciting individual carbon atoms to at least the energy level described by the Russell-Saunders symbol $^5$S while simultaneously subjecting said carbon atoms to the action of a strong externally applied magnetic field.

2. A method according to claim 1, wherein the excitation step is performed by establishing an electric glow discharge between a pair of spectroscopically pure graphite rods in a predominantly nitrogen atmosphere at low pressure.

3. A method according to claim 1, wherein the excitation step is performed by establishing an electrical arc discharge through a mass of carbon black in an air atmosphere at reduced pressure.

4. A method according to claim 3, wherein said arc discharge is maintained for a total discharge time of at least about 1 hour by maintaining the arc on for one minute cycles each separated by a period of five minutes.

5. A method according to claim 3, in which the mass of carbon black is maintained at about the temperature of Dry Ice.

6. A method according to claim 1, wherein the excitation step and the magnetic field is provided simultaneously by the steps of
    disposing a graphite rod inside a conductive coil of high current-carrying capacity, and
    discharging a large fully charged capacitor through said coil.

7. A method according to claim 6, wherein said capacitor is a 20,000 volt, 15 microfarad capacitor.

References Cited

UNITED STATES PATENTS

| | | | |
|---|---|---|---|
| 2,635,994 | 4/1953 | Tierman | 204—173 |
| 3,207,582 | 9/1965 | Inoue | 23—209.1 |

EDWARD J. MEROS, *Primary Examiner.*